Jan. 4, 1927.　　　　　　　　　　　　　　　　　　　1,612,951
E. SPANGLER
ASH REMOVING ATTACHMENT FOR MOTOR VEHICLES
Filed March 5, 1926
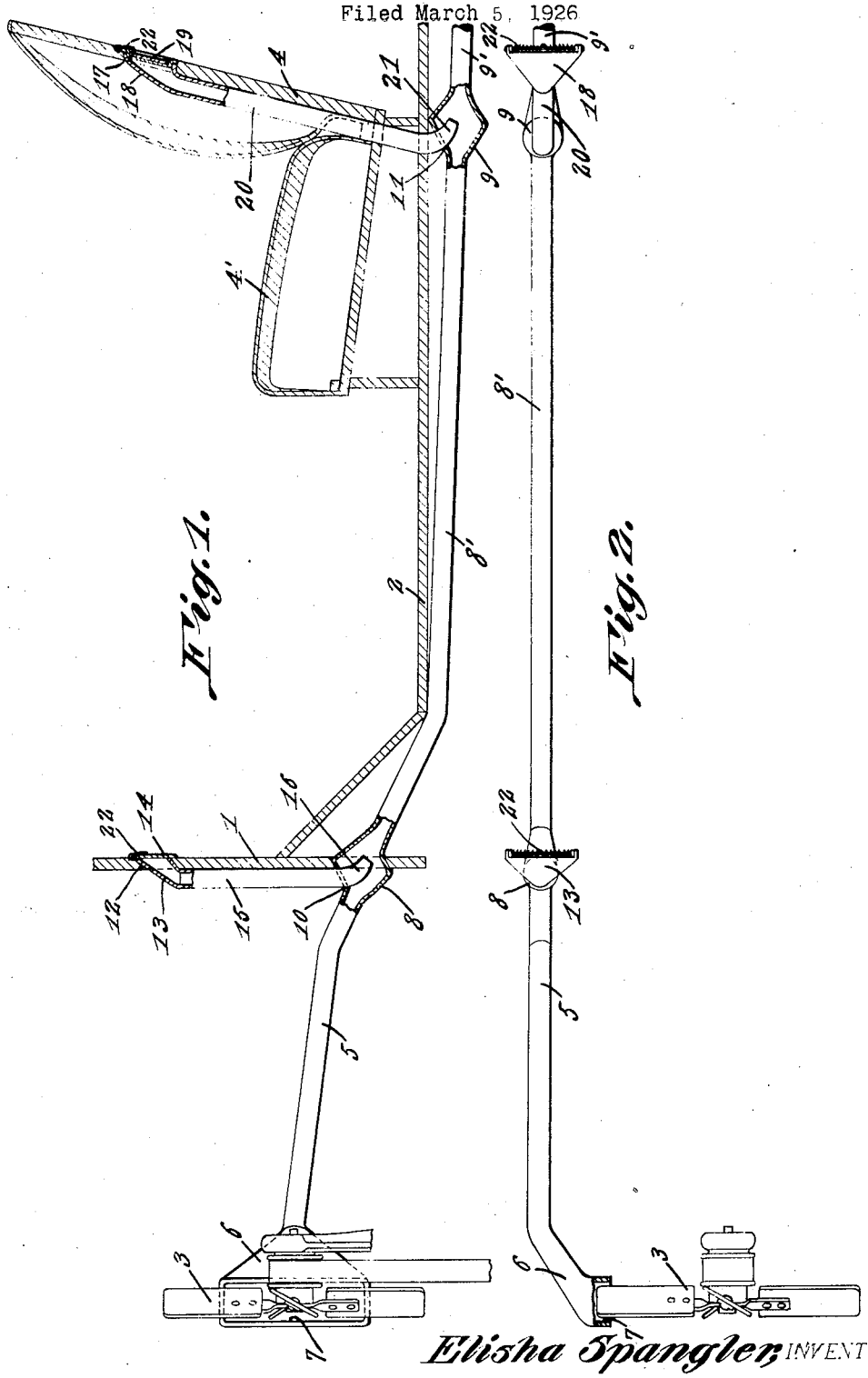
Elisha Spangler, INVENTOR.
BY
Geo. P. Kimmel, ATTORNEY.

Patented Jan. 4, 1927.

1,612,951

UNITED STATES PATENT OFFICE.

ELISHA SPANGLER, OF HARTFORD CITY, INDIANA.

ASH-REMOVING ATTACHMENT FOR MOTOR VEHICLES.

Application filed March 5, 1926. Serial No. 92,487.

This invention relates to an ash removing attachment designed primarily for use in connection with motor vehicles of the closed type, but it is to be understood that it can be employed in connection with any type of motor vehicle for which it is found applicable, and the invention has for its object to provide, in a manner as hereinafter set forth, an attachment of such class operated from the fan of a vehicle and in convenient reach of the occupants of the automobile for expeditiously disposing of cigar and cigarette ashes and the like from within the body of the vehicle, especially the closed car type, without necessitating the opening of the doors thereof.

Further objects of the invention are to provide, in a manner as hereinafter set forth, an ash removing attachment which is simple in its construction and arrangement, strong, durable, compact, thoroughly efficient in its use, automatic in its action, readily installed with respect to the vehicle and comparatively inexpensive to manufacture.

With the foregoing and other objects in view the invention consists of the novel construction, combination and arrangement of parts as hereinafter more specifically described and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:—

Figure 1 is fragmentary view, in section, of a motor vehicle showing the adaptation therewith of an ash removing attachment in accordance with this invention.

Figure 2 is a top plan view, partly in section, of an ash removing attachment in accordance with this invention.

The attachment is illustrated in connection with a motor vehicle of the two seat type, such as a coach or sedan, but it is to be understood that the attachment can be set up for use in connection with motor vehicles of the coupé type or single seat type.

Referring to the drawings in detail 1 denotes the instrument board of the vehicle, 2 the floor, 3 the fan, and 4 the back of a front seat 4'.

An ash removing attachment, in accordance with this invention, comprises an intake pipe 5 having its forward end formed with a triangular shaped head 6 provided with a rectangular air intake opening 7 which is disposed laterally with respect to the fan 3 and on the operation of the latter the opening 7, head 6 and pipe 5 provides means for conducting air currents in a direction to cause discharge of ashes and the like from the collectors 8 and 9 at the rear end of the vehicle. The intake pipe at its rear end opens into the collector 8 and leading from the latter is a discharge pipe 8' which opens into the collector 9 and leading from the latter is a discharge pipe 9' which opens at the rear of the vehicle. The collector 8, as well as the collector 9, tapers from its center towards each end and the top of the forward portion of the collector 8 is formed with an opening 10 and the top of the forward portion of the collector 9 is formed with an opening 11. The rear portion of the collector 8, is positioned below the floor 2 and the discharge pipes as well as the collector 9 are also positioned below the floor 2 and under such condition the same is concealed. The forward portion of the collector 8 and the intake pipe 5, as well as the head 6 is positioned within the engine hood. The collector 8 is mounted in and extends through the lower portion of the instrument board 1.

The instrument board 1, near the top thereof, is formed with an opening 12 in which is mounted a triangular shaped receiver 13 formed with a hinged closure 14. The receiver 13 opens into the body of the car and is normally closed by the closure 14. Arranged forwardly of the instrument board 1 and opening into the receiver 13 is a vertically disposed conducting pipe 15 which extends through the opening 10 and into the collector 8 and has its lower terminal portion reduced as well as rearwardly inclined or curved. Such terminal portion is indicated at 16.

The back 4 of the front seat 4' is formed with an opening 17 in which is arranged a triangular shaped receiver 18 which opens into the rear of the back 4 and is normally closed by a hinged closure 19. Connected to, communicating with and depending from the receiver 18, as well as through the floor 2 and opening into the collector 9 is a conducting pipe 20 having a rearwardly curved lower terminal portion 21 which extends through the opening 11. Each of the closures 14 and 19 is provided with a controlling spring 22 for normally maintaining its respective receiver closed.

On the operation of the fan 3 the air will be forced through the pipe 5 and causes discharge of any matter deposited by the pipe 15 or the pipe 20 into a collector and under such conditions ashes and the like can be disposed of without opening the doors of the car body. The ashes and the like are discharged while riding and will be prevented from lodging on any of the occupants of the car. The attachment can be built of any suitable material and placed at any desired point to be concealed, but with the intake head arranged in opposed relation with respect to the fan. The current of air traveling through the pipes 5, 8' and 9' will set up a suction action on the pipes 15 and 20 so as to pull the ashes from off the cigars or cigarettes when the hinged closure is shifted to open position.

It is thought the many advantages of an ash removing attachment, in accordance with this invention can be readily understood, and although the preferred embodiment of the invention is as illustrated and described, yet it is to be understood that changes in the details of construction can be had which will fall within the scope of the invention as claimed.

What I claim is:—

1. An ash removing attachment for motor vehicles comprising a collector, an air intake pipe for receiving air from the fan of a motor vehicle and opening at its rear end into said collector, a normally closed receiver adapted to open into the vehicle, a conducting pipe leading from said receiver and opening at its lower end into said collector, and a discharge pipe leading from said collector.

2. An ash removing attachment for motor vehicles comprising a collector, an air intake pipe for receiving air from the fan of a motor vehicle and opening at its rear end into said collector, a normally closed receiver adapted to open into the vehicle, a conducting pipe leading from said receiver and opening at its lower end into said collector, a discharge pipe leading from said collector, said receiver provided with a spring controlled closure and said conducting pipe having its lower terminal portion directed rearwardly within said collector.

3. An ash removing attachment for motor vehicles comprising a collector, an air intake pipe for receiving air from the fan of a motor vehicle and opening at its rear end into said collector, a normally closed receiver adapted to open into the vehicle, a conducting pipe leading from said receiver and opening at its lower end into said collector, and a discharge pipe leading from said collector, said collector tapering from its center towards each end.

4. An ash removing attachment for motor vehicles comprising a collector, an air intake pipe for receiving air from the fan of a motor vehicle and opening at its rear end into said collector, a normally closed receiver adapted to open into the vehicle, a conducting pipe leading from said receiver and opening at its lower end into said collector, a discharge pipe leading from said collector, said receiver provided with a spring controlled closure and said conducting pipe having its lower terminal portion directed rearwardly within said collector, and said collector tapering from its center towards each end.

In testimony whereof, I affix my signature hereto.

ELISHA SPANGLER.